US011823030B2

(12) United States Patent
Shi et al.

(10) Patent No.: US 11,823,030 B2
(45) Date of Patent: Nov. 21, 2023

(54) NEURAL NETWORK INFORMATION RECEIVING METHOD, SENDING METHOD, SYSTEM, APPARATUS AND READABLE STORAGE MEDIUM

(71) Applicant: Tsinghua University, Beijing (CN)

(72) Inventors: Luping Shi, Beijing (CN); Shuang Wu, Beijing (CN); Jing Pei, Beijing (CN); Guoqi Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 1116 days.

(21) Appl. No.: 16/477,422

(22) PCT Filed: Dec. 5, 2017

(86) PCT No.: PCT/CN2017/114670
§ 371 (c)(1),
(2) Date: Jul. 11, 2019

(87) PCT Pub. No.: WO2018/137412
PCT Pub. Date: Aug. 2, 2018

(65) Prior Publication Data
US 2019/0377998 A1 Dec. 12, 2019

(30) Foreign Application Priority Data

Jan. 25, 2017 (CN) .......................... 201710056198.9
Jan. 25, 2017 (CN) .......................... 201710056244.5

(51) Int. Cl.
*G06N 3/049* (2023.01)
(52) U.S. Cl.
CPC .................... *G06N 3/049* (2013.01)
(58) Field of Classification Search
CPC ................................................... G06N 3/049
(Continued)

(56) References Cited

U.S. PATENT DOCUMENTS 5,577,028 A * 11/1996 Chugo .................. H04L 45/302
370/409
7,184,937 B1 * 2/2007 Su .......................... G01R 23/02
348/192

(Continued)

FOREIGN PATENT DOCUMENTS

CN 102263636 A 11/2011
CN 105095961 A * 11/2015

(Continued)

OTHER PUBLICATIONS

V. E. Mujica, D. Sisalem and R. Popescu-Zeletin, "Neural: a self-organizing routing algorithm for ad hoc networks," Third International Symposium on Modeling and Optimization in Mobile, Ad Hoc, and Wireless Networks (WiOpt'05), 2005, pp. 259-266, doi: 10.1109/WIOPT.2005.32. (Year: 2005).*

(Continued)

*Primary Examiner* — James D. Rutten
(74) *Attorney, Agent, or Firm* — WOMBLE BOND DICKINSON (US) LLP

(57) ABSTRACT

There is provided a neural network information receiving method and system, and a sending method and system. The receiving method comprises: acquiring a reception initiation time for neuron information (S100); receiving rostral neuron information output by rostral neurons (S200); acquiring delay information of the rostral neuron information according to the reception initiation time, the rostral neuron information and a delay algorithm (S300); and determining composite information output by the rostral neurons according to the rostral neuron information and the delay information (S400). The receiving method and system and sending method and system take the delay information into consideration in the output information of neurons, such that the neuron information is able to carry more detailed time- (Continued)

S100a'
Acquiring, according to neuron information computed by current neurons, routing information corresponding to the neuron information, wherein the routing information includes information of all the routing neurons through which the neuron information passes when being sent from the current neurons to destination neurons, and link information among the routing neurons. The routing information comprises an information processing transmission amount determined according to an information processing amount of the routing neurons and/or an information transmission amount among the routing neurons S200a'
Setting the delay information corresponding to the routing information as a first delay if the information processing transmission amount is greater than or equal to a threshold for information amount, or otherwise setting the delay information as a second delay, wherein the first delay is longer than the second delay S300a'
Outputting the neuron information according to the neuron information and the delay information domain information, thus augmenting operation modes of the neurons and enhancing the generalization ability of the whole network.

14 Claims, 9 Drawing Sheets

(58) Field of Classification Search
USPC .......................................................... 706/22
See application file for complete search history.

(56) References Cited

U.S. PATENT DOCUMENTS

| | | | |
|---|---|---|---|
| 7,814,038 | B1 | 10/2010 | Repici |
| 2005/0283487 | A1* | 12/2005 | Karlsson ................. G06F 3/065 |
| 2009/0076993 | A1* | 3/2009 | Ananthanarayanan ...................... G06N 3/049 703/11 |
| 2014/0180988 | A1* | 6/2014 | Alvarez-Icaza Rivera ................. G06N 3/04 706/27 |
| 2014/0344203 | A1 | 11/2014 | Ahn |
| 2014/0379623 | A1* | 12/2014 | Piekniewski .......... G06N 3/049 706/15 |
| 2016/0026912 | A1 | 1/2016 | Falcon et al. |
| 2016/0328645 | A1 | 11/2016 | Lin et al. |
| 2016/0328646 | A1 | 11/2016 | Lin et al. |
| 2018/0032856 | A1* | 2/2018 | Alvarez-Icaza ........ G06N 3/049 |
| 2019/0362231 | A1 | 11/2019 | Li et al. |

FOREIGN PATENT DOCUMENTS

| | | |
|---|---|---|
| CN | 105095961 A | 11/2015 |
| CN | 106056212 A | 10/2016 |
| CN | 106845632 A | 6/2017 |
| CN | 106875003 A | 6/2017 |
| CN | 106897768 A | 6/2017 |
| CN | 106909969 A | 6/2017 |
| WO | 2013/181410 A2 | 12/2013 |

OTHER PUBLICATIONS

W. A. Richardson, R. L. Clouse, Soowon Kim and M. B. Waldron, "Synchronization using an adaptive threshold in a biologically inspired spatiotemporal neuron," Proceedings of International Conference on Neural Networks (ICNN'96), Washington, DC, USA, 1996, pp. 728-733 vol. 2 (Year: 1996).*
International Search Report for Application No. PCT/CN2017/114670, dated Mar. 6, 2018, 2 pages.
Deng et al., GXNOR-Net: Training deep neural networks with ternary weights and activations without full-precision memory under a unified discretization framework. Neural Netw. Apr. 2018; 100:49-58.
Li et al., Training deep neural networks with discrete state transition. Neurocomputing. Jul. 4, 2017;272:154-162.
International Search Report for Application No. PCT/CN2017/114667, dated Apr. 3, 2018, 2 pages.

* cited by examiner

NEURAL NETWORK INFORMATION RECEIVING METHOD, SENDING METHOD, SYSTEM, APPARATUS AND READABLE STORAGE MEDIUM

RELATED APPLICATION

The present application claims the benefit of a priority of Chinese Patent Application with No. 201710056244.5, name "NEURAL NETWORK INFORMATION RECEPTION METHOD AND SYSTEM" and filed on Jan. 25, 2017, and the benefit of a priority of Chinese Patent Application with No. 201710056198.9, name "NEURAL NETWORK INFORMATION SENDING METHOD AND SYSTEM" and filed on Jan. 25, 2017, the entire contents of which are incorporated herein by reference.

TECHNICAL FIELD

The disclosure relates to a technical field of artificial neural network, and more particularly, to a neural network information receiving method, a sending method, a system, an apparatus and a non-transitory computer readable storage medium.

BACKGROUND

The vast majority of traditional neural network researches are still implemented in von Neumann computer software with a high performance GPU (Graphic Processing Unit) platform. The hardware overhead, energy consumption and information processing speed of the whole process are not satisfying. To this end, the field of neuromorphic computing has been developing rapidly in recent years, that is, a hardware circuit is directly used to construct a neural network to simulate functions of a brain, attempting to realize a large-scale parallel computing platform with low-energy consumption and capable of supporting complex pattern learning, making the processing result of the neural network more bionic.

The neuron output information computed according to the neuron information receiving method in traditional neural network is significantly different from the actual bionic results, thus causing the speed for processing information to decrease and thereby increasing unnecessary hardware overhead.

SUMMARY

On that basis, regarding the problem that the neuron information computed by the traditional neural information receiving method is significantly different from the actual bionic results, it is necessary to provide a neural network information receiving method, a sending method, a system, an apparatus and a non-transitory computer readable storage medium, wherein the neural network information receiving method comprises:
acquiring a reception initiation time for neuron information;
receiving rostral neuron information output by rostral neurons;
acquiring delay information of the rostral neuron information according to the reception initiation time, the rostral neuron information and a delay algorithm;
determining composite information output by the rostral neurons according to the rostral neuron information and the delay information.

In one embodiment, acquiring delay information of the rostral neuron information according to the reception initiation time, the rostral neuron information and delay algorithm comprises:
acquiring a reception time for receiving the rostral neuron information output by the rostral neurons;
acquiring a duration during which no rostral neuron information is received according to the reception time and the reception initiation time;
determining the duration as first delay information of the rostral neuron information.

In one embodiment, acquiring delay information of the rostral neuron information according to the reception initiation time, the rostral neuron information and delay algorithm further comprises:
acquiring, at the reception initiation time, an initial value of a duration-related physical parameter including a physical parameter whose variation is duration-related;
acquiring, at a time when the rostral neuron information is received, a terminal value of the duration-related physical parameter, and computing a duration for variation of the duration-related physical parameter according to the initial value, the terminal value and an algorithm for duration on variation of the physical parameter;
determining the duration for variation of the duration-related physical parameter as second delay information of the rostral neuron information.

In one embodiment, receiving rostral information output by rostral neurons comprises:
receiving artificial rostral neuron information output by artificial rostral neurons or receiving pulse rostral neuron information output by pulse rostral neurons.

In one embodiment, determining composite information output by the rostral neurons according to the rostral neuron information and the delay information comprises:
determining first composite information of the rostral neurons by accumulating the rostral neuron information and the delay information.

In one embodiment, determining composite information output by the rostral neurons according to the rostral neuron information and the delay information comprises:
determining second composite information of the rostral neurons by multiplying the rostral neuron information with the delay information.

In one embodiment, the reception initiation time for neuron information is determined, then the rostral neuron information output by the rostral neurons is received, and the delay information from receiving the reception initiation time for the rostral neuron information to receiving the rostral neuron information is acquired according to the reception initiation time, the rostral neuron information and a preset delay algorithm, and the composite information output by the rostral neurons is determined by performing logical computations on the delay information and the received rostral neuron information. Since the composite information contains the delay information, the introduction of the delay information greatly augments the operation mode of the neurons, enhancing the generalization ability of the whole neural network and making the processing result of the neuron information more bionic.

In one embodiment, with a method of direct timing, by determining the reception initiation time as an initiation time and determining a time when the rostral neuron information is received as a termination time, the duration during which no rostral neuron information is received is acquired and is taken as the delay information. The present embodiment employs the direct timing to acquire the delay information. Such an implementation manner is simple and straightforward, and can reduce the implementation cost of the neural network while improving the bionic degree of the neuron information.

In one embodiment, with a method of measuring a variation of the duration-related physical parameter, by recording an initial value of the duration-related physical parameter at the reception initiation time and recording the terminal value of the duration-related physical parameter at a time when the rostral neuron information is received, a duration for variation of the duration-related physical parameter is computed according to the initial value, the terminal value and the algorithm for duration on variation of the physical parameter, and the duration for variation is determined as the delay information of the rostral neuron information. The present embodiment employs a method of measuring a variation of the physical parameter with diversified optional implementation manners and stable and reliable measurement results, hence reducing the implementation cost of the neural network while improving the bionic degree of the neuron information.

In one embodiment, the neural network information receiving method in the present embodiment may be used in either an artificial neural network or a pulse neural network with a wide range of applications, thus improving the bionic degree of the processing results of the artificial neural network information or the pulse neural network information.

In one embodiment, the first composite information of the rostral neurons is determined by accumulating the rostral neuron information with the delay information, wherein the first composite information acquired by accumulation corresponds to adding an initial offset to the neural network, which realizes dynamical adjustment on releasing thresholds during the operational process of the neural network and improves bionic degree of the processing result of the neural network information.

In one embodiment, the second composite information of the rostral neurons is determined by multiplying the rostral neuron information with the delay information, wherein the rostral neuron information acquired by multiplication corresponds to adding a scaling factor to the neural network, which adjusts the sensitivity of neurons, making the neural network compatible with different applications with low precision but large range and high precision but small range, improving the bionic degree of neural network information processing result in different application fields.

The present disclosure further provides a neural network information reception system comprising:
- a reception initiation time acquiring module configured to acquire a reception initiation time for the neuron information;
- a rostral neuron information receiving module configured to receive rostral neuron information output by rostral neurons;
- a delay information computing module configured to acquire delay information of the rostral neuron information according to the reception initiation time, the rostral neuron information and a delay algorithm;
- a composite information acquiring module configured to determine composite information output by the rostral neurons according to the rostral neuron information and the delay information.

The present disclosure further provides a neural network information sending method comprising: acquiring, according to neuron information computed by current neurons, routing information corresponding to the neuron information, wherein the routing information includes information of all the routing neurons through which the neuron information passes when being sent from the current neurons to destination neurons, and link information among the routing neurons;
- acquiring, according to the routing information, delay information corresponding to the routing information; and
- outputting the neuron information according to the neuron information and the delay information.

In one embodiment, the routing information comprises:
- an information processing transmission amount determined according to an information processing amount of the routing neurons and/or an information transmission amount among the routing neurons.

In one embodiment, acquiring, according to the routing information, delay information corresponding to the routing information comprises:
- setting the delay information corresponding to the routing information as a first delay if the information processing transmission amount is greater than or equal to a threshold for information amount, or otherwise setting the delay information as a second delay, wherein the first delay is longer than the second delay.

In one embodiment, the routing information comprises:
- A distance amount determined according to a total number of the routing neurons and/or a total number of links among the routing neurons.

In one embodiment, acquiring, according to the routing information, delay information corresponding to the routing information comprises:
- Setting the delay information corresponding to the routing information as a third delay if the distance amount is greater than or equal to a distance threshold, or otherwise setting the delay information as a fourth delay, wherein the third delay is longer than the fourth delay.

In one embodiment, outputting the neuron information according to the neuron information and the delay information comprises:
- combining the neuron information and the delay information, after being encoded according to an output information encoding rule, into output information of the current neurons; and
- outputting the output information of the current neurons.

In one embodiment, outputting the neuron information according to the neuron information and the delay information comprises:
- acquiring an output initiation time for the current neurons;
- at the output initiation time, outputting the neuron information with a delay according to a delay determined by the delay information.

In one embodiment, the delay information is determined according to the routing information about the routing neurons through which the neuron information computed by the current neurons is sent to the destination neuron, and the neuron information is output based on the delay information and the neuron information. Since the delay information is determined according to the routing information of the neuron information, and the delay information is considered when outputting the neuron information, the neuron information is enabled to carry richer time domain information, thus augmenting operation modes of the neurons and enhancing the generalization ability of the whole network.

The present disclosure also provides a neural network information sending system including:

a routing information acquiring module, configured to acquire, according to neuron information computed by current neurons, routing information corresponding to the neuron information, wherein the routing information includes information of all the routing neurons through which the neuron information passes when being sent from the current neurons to destination neurons, and link information among the routing neurons a delay information acquiring module configured to acquire, according to the routing information, delay information corresponding to the routing information;

a neuron information output module configured to output the neuron information according to the neuron information and the delay information.

The present disclosure further discloses a computing system comprising: a processor and a memory storing computer instructions thereon, wherein the computer instructions, when executed by the processor, cause the processor to execute the steps of the methods in the above embodiments.

The present disclosure further provides a non-transitory computer readable storage medium holding executable instructions, wherein the executable instructions, when executed by a processor, cause the processor to execute the steps of the methods in the above embodiments.

DETAILED DESCRIPTION

In order to make the object, technical solutions, and advantages of the present disclosure apparent, this disclosure will be further described with reference to the accompanying drawings and embodiments as below. It should be understood that the specific embodiments described herein are merely illustrative of the present disclosure and are not intended to limit the present disclosure.

Figure 1:
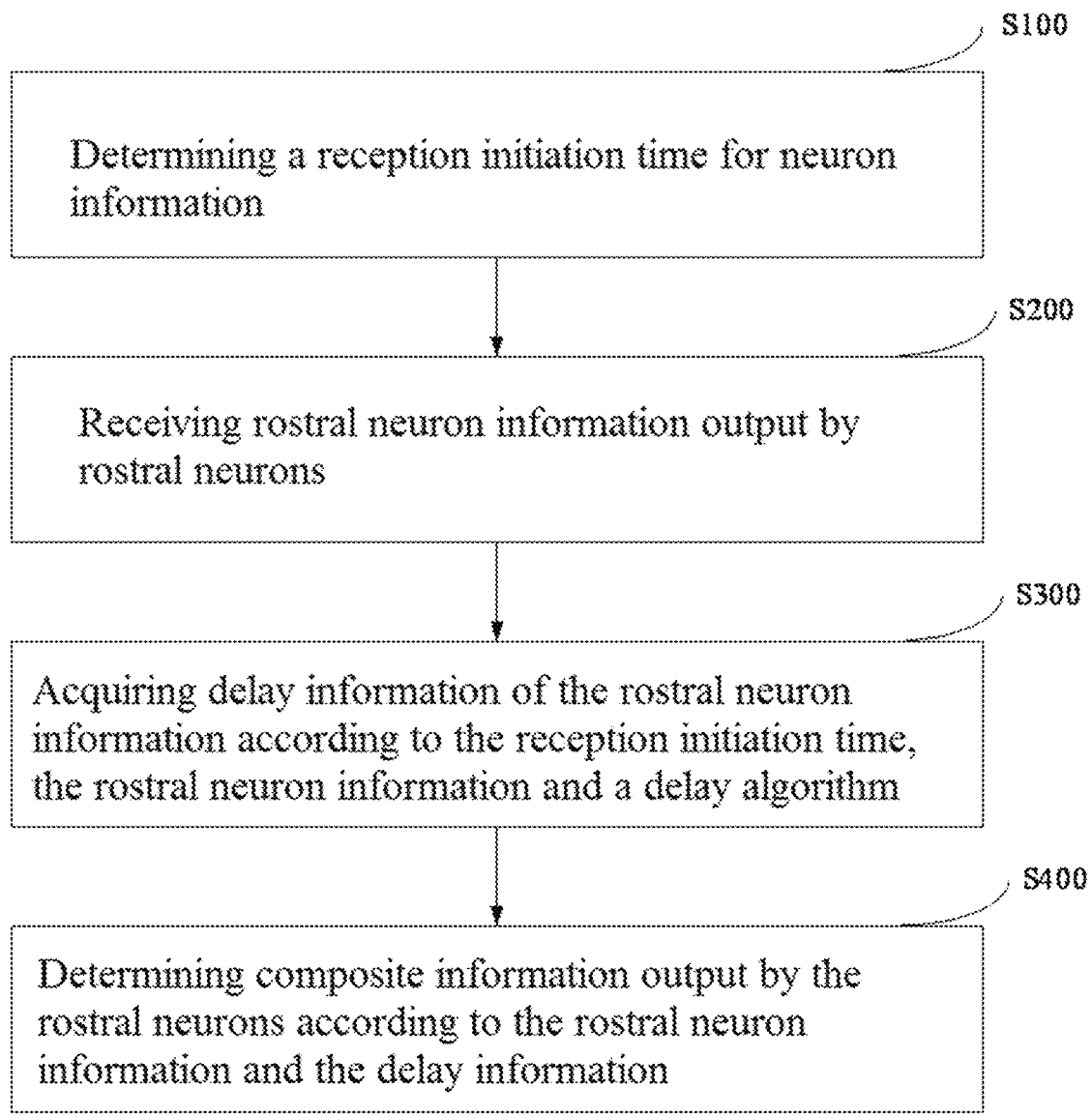
FIG. 1 is a schematic flowchart of a neural network information receiving method according to an embodiment.

FIG. 1 is a schematic flowchart of a neural network information receiving method according to an embodiment, where the neural network information receiving method as shown in FIG. 1 comprises:

Step S100, determining a reception initiation time for neuron information.

Specifically, the reception initiation time for neuron information refers to a unified reception initiation time for all neurons or an independent reception initiation time for a single neuron defined according to the overall requirement of a task; or a reception initiation time acquired by individual neurons according to a preset reception initiation time algorithm in a task, wherein the preset reception initiation time algorithm may perform a computation according to a circuit structure of a neural network or perform a computations of reception initiation times of different information according to requirements of a task.

Upon the determination of the reception initiation time, the current neuron initiates the recording of a delayed duration during which no rostral neuron information is received.

Step S200, receiving rostral neuron information output by rostral neurons.

Specifically, receiving rostral neuron information includes receiving the rostral neuron information at any time after the reception initiation time. According to task requirements of a neural network, the current neuron may ignore the received rostral neuron information after a certain period of time since the reception initiation time, to achieve a node control of the neuron information.

Step S300, acquiring delay information of the rostral neuron information according to the reception initiation time, the rostral neuron information and a delay algorithm.

Specifically, according to the reception initiation time and the time when the rostral neuron information is received and with a delay algorithm, the delay information of the rostral neuron information is acquired. The delay algorithm includes a method of acquiring a delayed duration by direct timing, or by a computation on variations in a duration-related physical parameter.

Step S400, determining composite information output by the rostral neurons according to the rostral neuron information and the delay information.

Specifically, the delay information and the received rostral neuron information are combined into composite information output by the rostral neurons, and the reception delay of the rostral neuron information is also considered in the final composite information, thus information amount carried by the neuron information is augmented.

In this embodiment, the reception initiation time for neuron information is determined, then the rostral neuron information output by the rostral neurons is received, and the delay information from receiving the reception initiation time for the rostral neuron information to receiving the rostral neuron information is acquired according to the reception initiation time, the rostral neuron information and a preset delay algorithm, and the composite information output by the rostral neurons is determined by performing logical computations on the delay information and the received rostral neuron information. Since the composite information contains the delay information, the introduction of the delay information greatly augments the operation mode of the neurons, enhancing the generalization ability of the whole neural network and making the processing result of the neuron information more bionic.

Figure 2:
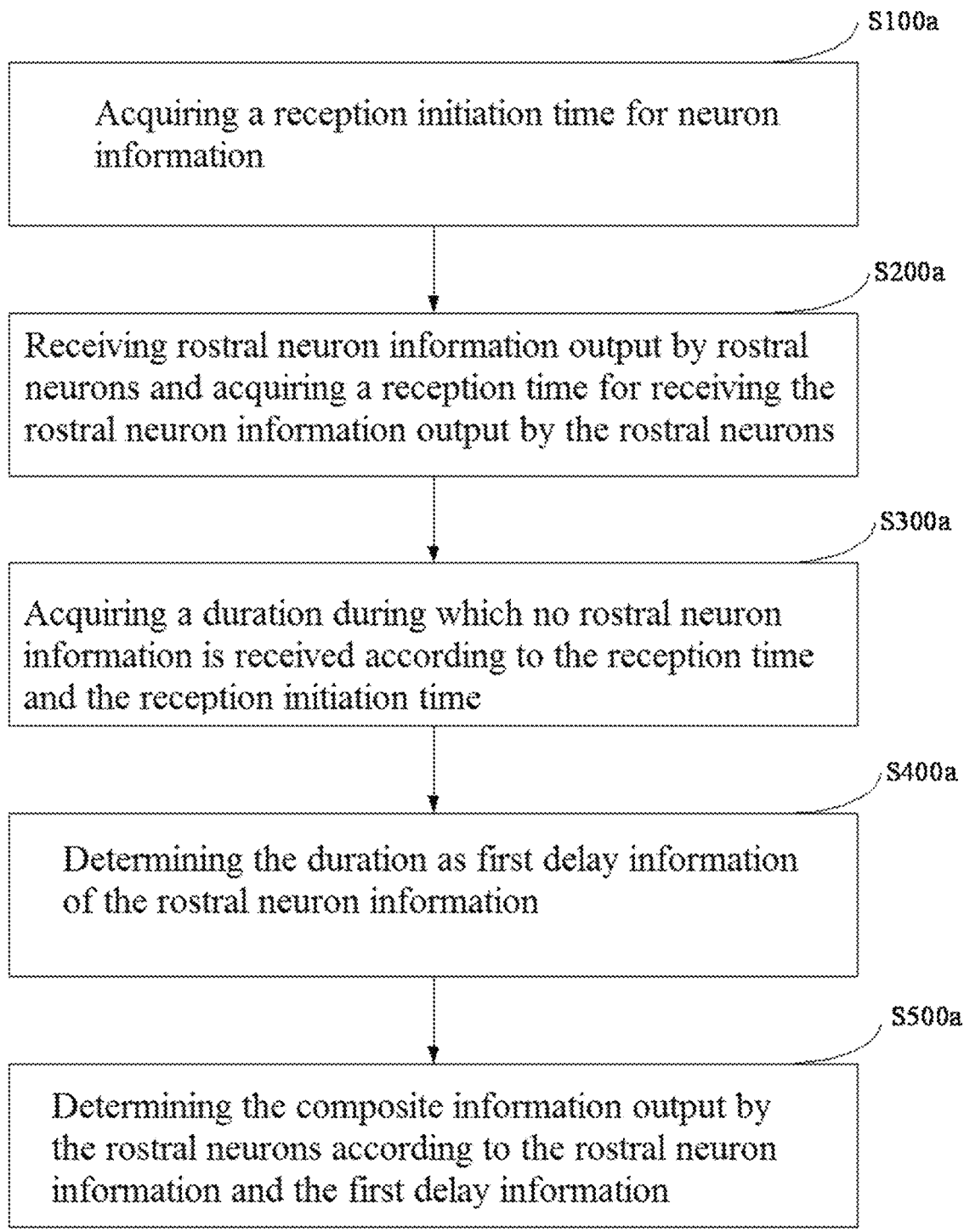
FIG. 2 is a schematic flowchart of a neural network information receiving method according to another embodiment.

FIG. 2 is a schematic flowchart of a neural network information receiving method according to another embodiment, where the neural network information receiving method as shown in FIG. 2 comprises:

Step S100a, acquiring a reception initiation time for neuron information.

Specifically, the Step S100a is the same as step S100.

Step S200a, receiving rostral neuron information output by rostral neurons and acquiring a reception time for receiving the rostral neuron information output by the rostral neurons.

Specifically, in this embodiment, a duration during which no rostral neuron information is received is acquired with a method of direct timing. The reception initiation time is determined as an initiation time of the duration during which no rostral neuron information is received. In practical use, a time domain scorer of a digital circuit may be used.

Step S300a: acquiring a duration during which no rostral neuron information is received according to the reception time and the reception initiation time.

Specifically, a time when the rostral neuron information is received is determined as a termination time of the duration during which no rostral neuron information is received; and the duration during which no rostral neuron information is received can be acquired by using the time difference between the termination time and the initiation time.

Step S400a, determining the duration as first delay information of the rostral neuron information.

Specifically, the duration is determined as the first delay information which is a reception delay for the rostral neuron information after the determined reception initiation time, acquired using a method of direct timing.

Step S500a: determining the composite information output by the rostral neurons according to the rostral neuron information and the first delay information.

Specifically, the rostral neuron information and the first delay information are combined into the composite information output by rostral neurons.

In this embodiment, by determining the reception initiation time as an initiation time and determining a time when the rostral neuron information is received as a termination time, the duration during which no rostral neuron information is received is acquired and is taken as the delay information. The present embodiment employs the direct timing to acquire the delay information. Such an implementation manner is simple and straightforward, and can reduce the implementation cost of the neural network while improving the bionic degree of the neuron information.

Figure 3:
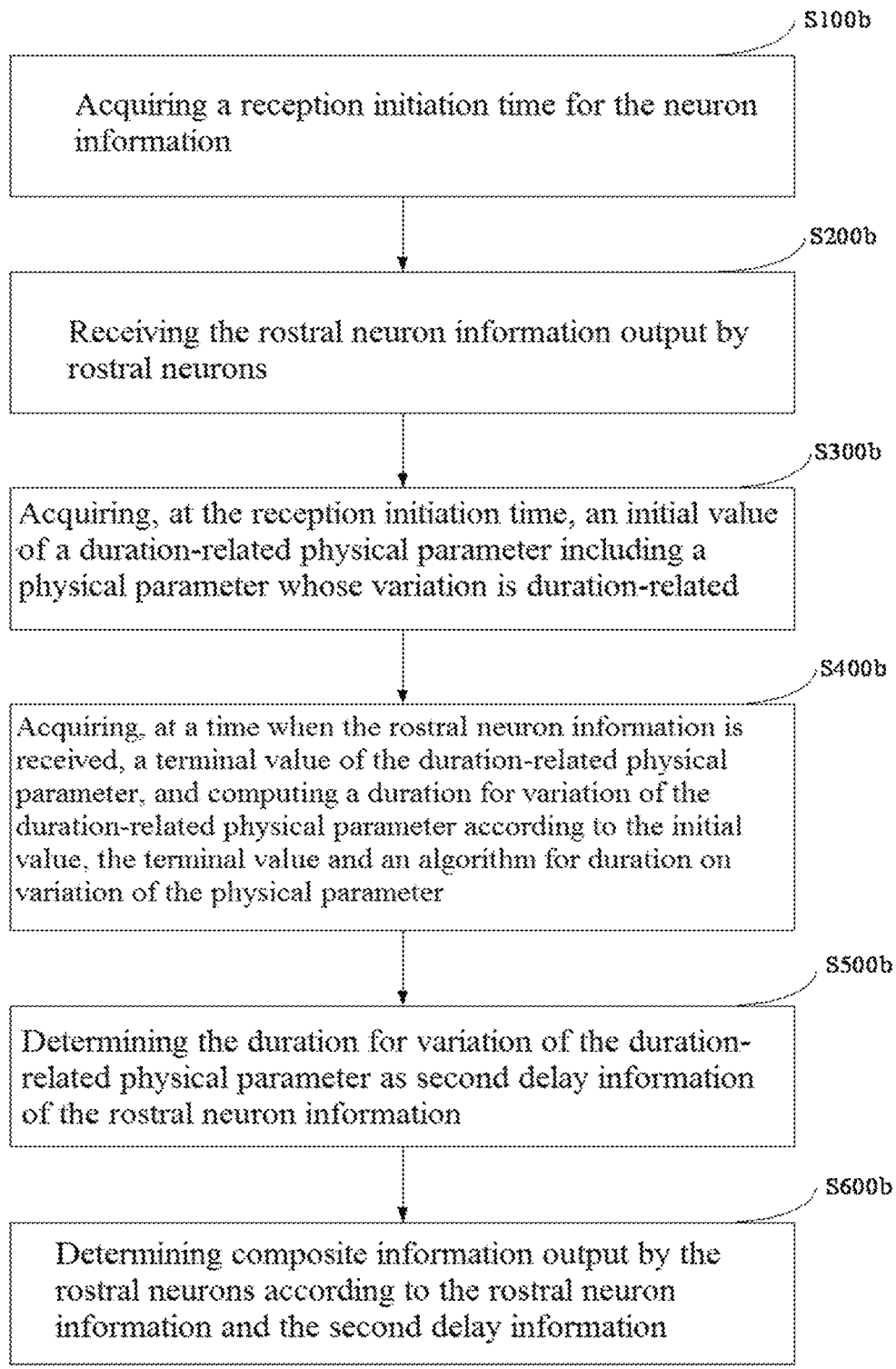
FIG. 3 is a schematic flowchart of a neural network information receiving method according to still another embodiment.
Figure 4:
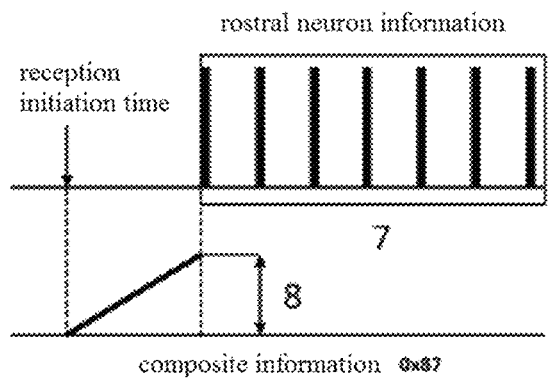
FIG. 4 is a schematic diagram of composite information according to an embodiment.

FIG. 3 is a schematic flowchart of a neural network information receiving method according to still another embodiment, where the neural network information receiving method shown in FIG. 3 comprises:

Step S100b, acquiring a reception initiation time for the neuron information.

Specifically, the step 100b is the same the step S100.

Step S200b, receiving the rostral neuron information output by rostral neurons.

Specifically, the step 200b is the same as the step S200.

Step S300b: acquiring, at the reception initiation time, an initial value of a duration-related physical parameter including a physical parameter whose variation is duration-related.

Specifically, the present embodiment employs a method of indirect measurement to acquire the duration during which no rostral neuron information is received. The duration-related physical parameter includes a duration-related electrical parameter involving duration-related voltage and current values and the likes. For the duration-related electrical parameter, based on the initial value, the value of the electrical parameter is related to the duration.

Step S400b: acquiring, at a time when the rostral neuron information is received, a terminal value of the duration-related physical parameter, and computing a duration for variation of the duration-related physical parameter according to the initial value, the terminal value and an algorithm for duration on variation of the physical parameter.

Specifically, the terminal value of the duration-related physical parameter is acquired at a time when the rostral neuron information is received, and then the duration for variation of the duration-related physical parameter can be computed according to the initiation value, the terminal value and the algorithm for duration on variation of the physical parameter. In practical use, a semiconductor device measuring the duration-related physical parameter is more suitable for the future CrossBar-structure type of neuron computation units.

Step S500b, determining the duration for variation of the duration-related physical parameter as second delay information of the rostral neuron information, where the second delay information is a duration during which no rostral neuron information is received and is measured according to the duration-related physical parameter.

Specifically, the duration for variation of the duration-related physical parameter is determined as the second delay information of the rostral neuron information.

Step S600b: determining composite information output by the rostral neurons according to the rostral neuron information and the second delay information.

Specifically, the rostral neuron information and the second delay information are combined into the composite information output by the rostral neuron.

In this embodiment, with a method of measuring a variation of the duration-related physical parameter, by recording the initial value of the duration-related physical parameter at the reception initiation time and recording the terminal value of the duration-related physical parameter at a time when the rostral neuron information is received, a duration for variation of the duration-related physical parameter is computed according to the initial value, the terminal value and the algorithm for duration on variation of the physical parameter, and the duration for variation is determined as the delay information of the rostral neuron information. The present embodiment employs a method of measuring a variation of the physical parameter with diversified optional implementation manners and stable and reliable measurement results, hence reducing the implementation cost of the neural network while improving the bionic degree of the neuron information.

In one embodiment, receiving the rostral neuron information output by rostral neurons comprises: receiving artificial rostral neuron information output by artificial rostral neurons, or receiving pulse rostral neuron information output by pulse rostral neurons. The rostral neuron information and the second delay information are combined into the composite information output by the rostral neurons.

Specifically, the neural network information receiving method in the present embodiment is suitable for not only an artificial neural network but also a pulse neural network, wherein combining the rostral neuron information and the delay information into the composite information output by the rostral neurons includes: combining the artificial rostral neuron information and the delay information into the composite information output by the artificial rostral neurons, or combining the pulse rostral neuron information and the delay information into the composite information output by the pulse rostral neurons.

In this embodiment, the neural network information receiving method in the present embodiment may be used in either an artificial neural network or a pulse neural network with a wide range of applications, thus improving the bionic degree of the processing results of the artificial neural network information or the pulse neural network information.

In one embodiment, determining composite information output by the rostral neurons according to the rostral neuron information and the delay information comprises: determining first composite information of the rostral neurons by accumulating the rostral neuron information and the delay information.

Specifically, the rostral neuron information and the delay information are accumulated; taking the pulse neurons as an example, $\delta=\Delta t+LIF(\theta)$
where $\delta$ is the composite information of pulse neurons, $\Delta t$ is the delay information, $LIF(\theta)$ is the received pulse rostral neuron information, and LIF can be other functions. At this time, it has been disclosed to adding an initial offset with an integral method LIF model, which realizes a dynamical adjustment on releasing thresholds during the operational process of the neural network. The offset can also be defined as a large negative value by codings, such that the destination neuron is in a strong suppression state, which is very beneficial in information broadcasting.

In this embodiment, the first composite information of the rostral neurons is determined by accumulating the rostral neuron information and the delay information, wherein acquiring the first composite information by accumulation corresponds to adding an initial offset to the neural network, realizing a dynamical adjustment on releasing thresholds during the operational process of the neural network and improving bionic degree of the processing result of the neural network information.

In one embodiment, determining composite information output by the rostral neurons according to the rostral neuron information and the delay information further comprising: determining second composite information of the rostral neurons by multiplying the rostral neuron information with the delay information.

Specifically, the rostral neuron information and the delay information are multiplied; taking pulse neurons as an example, $\delta=\Delta t \cdot LIF(\theta)$
where $\delta$ is the composite information of pulse neurons, $\Delta t$ is the delay information, $LIF(\theta)$ is the received pulse rostral neuron information, and LIF can be other functions. At this time, it has been disclosed to adding a scaling factor with an integral method LIF model, which adjusts the sensitivity of neurons, making the neural network compatible with different applications with low precision but large range and high precision but small range. Similarly, $\Delta t=-1$ can be defined, and the current neuron is an suppressing neuron, thereby distinguishing between two different types of pulse signals with the suppressing neurons function as information flow control nodes in the network.

In this embodiment, the second composite information of the rostral neurons is determined by multiplying the rostral neuron information with the delay information, wherein the acquired rostral neuron information by multiplication correspond to a scaling factor added to the neural network, which adjusts the sensitivity of neurons, making the neural network compatible with different applications with low precision but large range and high precision but small range, improving the bionic degree of neural network information processing result in different application fields.

Figure 5:
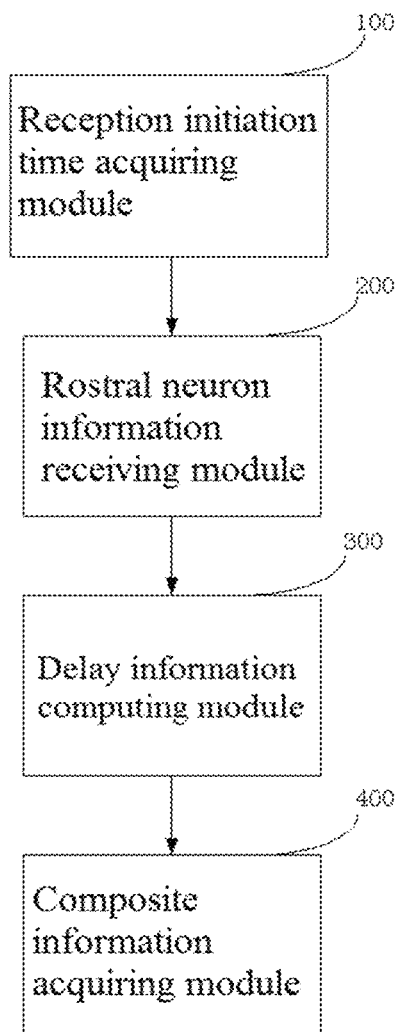
FIG. 5 is a structural diagram showing a neural network information reception system according to an embodiment.

FIG. 5 is a structural diagram of a neural network information reception system according to an embodiment, wherein the neural network information reception system shown in FIG. 5 comprises:

a reception initiation time acquiring module 100 configured to acquire a reception initiation time for the neuron information.

a rostral neuron information receiving module 200 configured to receive rostral neuron information output by rostral neurons, including receiving artificial rostral neuron information output by the artificial rostral neurons, or receiving the pulse rostral neuron information output by the pulse rostral neurons.

a delay information computing module 300 configured to acquire delay information of the rostral neuron information according to the reception initiation time, the rostral neuron information and a delay algorithm.

a composite information acquiring module 400 configured to determine composite information output by the rostral neurons according to the rostral neuron information and the delay information; a first composite information acquiring unit configured to determine first composite information of the rostral neurons by accumulating the rostral neuron information and the delay information, and a second composite information acquiring unit configured to determine second composite information of the rostral neurons by multiplying the rostral neuron information with the delay information.

In this embodiment, the reception initiation time for neuron information is determined, then the rostral neuron information output by the rostral neurons is received, and the delay information from receiving the reception initiation time of the rostral neuron information to receiving the rostral neuron information is acquired according to the reception initiation time, the rostral neuron information and a preset delay algorithm, and the composite information output by the rostral neurons is determined by performing logical computations on the delay information and the received rostral neuron information. Since the composite information contains the delay information, the introduction of the delay information greatly augments the operation mode of the neurons, enhancing the generalization ability of the whole neural network and making the processing result of the neuron information more bionic.

In this embodiment, the neural network information receiving method in the present embodiment may be used in either an artificial neural network or a pulse neural network with a wide range of applications, thus improving the bionic degree of the processing results of the artificial neural network information or the pulse neural network information. The first composite information of the rostral neurons is determined by accumulating the rostral neuron information with the delay information, wherein acquiring the first composite information by accumulation corresponds to adding an initial offset to the neural network, realizing a dynamical adjustment on releasing thresholds during the operational process of the neural network and improving bionic degree of the processing result of the neural network information. The second composite information of the rostral neurons is determined by multiplying the rostral neuron information with the delay information, wherein acquiring the rostral neuron information by multiplication correspond to adding a scaling factor to the neural network, which adjusts the sensitivity of neurons, makes the neural network compatible with different applications with low precision but large range and high precision but small range, improving the bionic degree of neural network information processing result in different application fields.

Figures 6, 7:
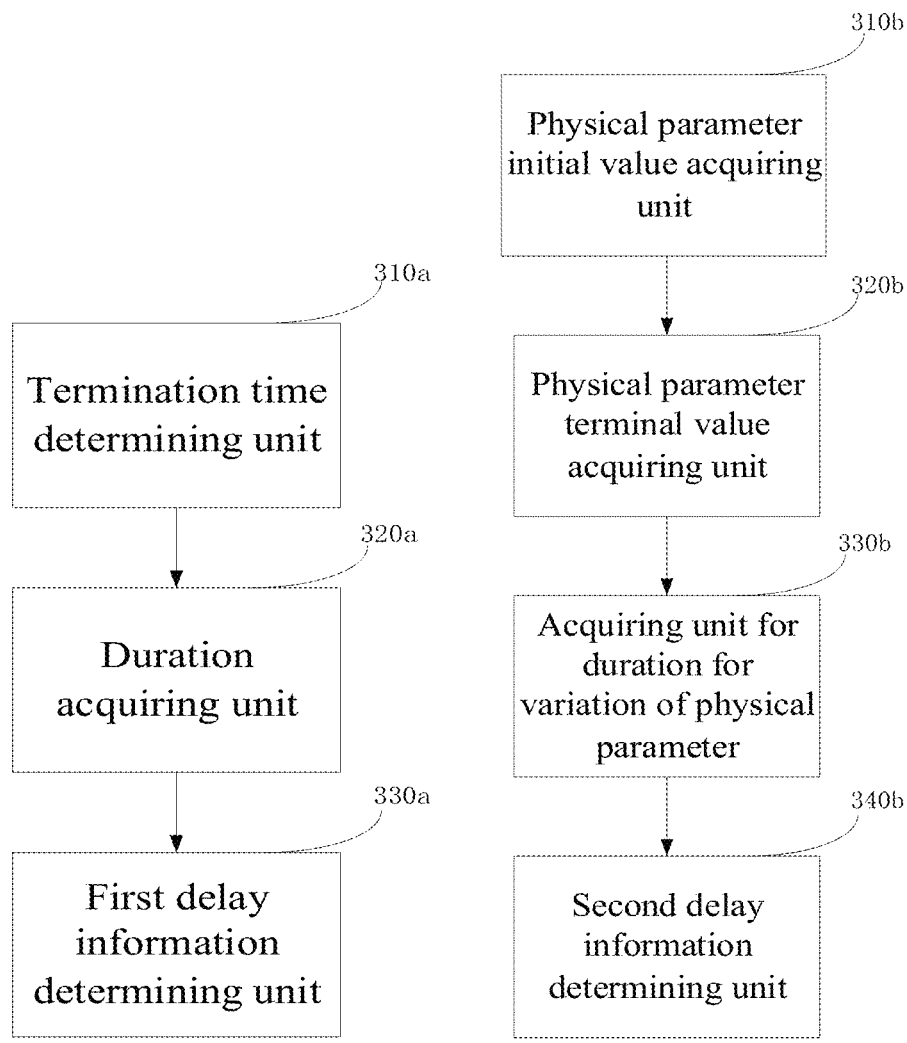
FIG. 6 is a structural diagram showing a neural network information reception system according to another embodiment.
FIG. 7 is a structural diagram showing a neural network information reception system according to still another embodiment.

FIG. 6 is a structural diagram of a neural network information reception system according to another embodiment, wherein the neural network information reception system shown in FIG. 6 comprises:

the delay information computing module comprising:
- a termination time determining unit 310a configured to acquire the reception time when the rostral neuron information output by the rostral neurons is received;
- a duration acquiring unit 320a configured to acquire a duration during which no rostral neuron information is received according to the reception time and the reception initiation time;
- a first delay information determining unit 330a configured to determine the duration as first delay information of the rostral neuron information.

In this embodiment, with a method of direct timing, by determining the reception initiation time as an initiation time and determining a time when the rostral neuron information is received as a termination time, the duration during which no rostral neuron information is received is acquired and is taken as the delay information. The present embodiment employs the direct timing to acquire the delay information. Such an implementation manner is simple and straightforward, and can reduce the implementation cost of the neural network while improving the bionic degree of the neuron information.

FIG. 7 is a structural diagram of a neural network information reception system according to still another embodiment, where the neural network information reception system shown in FIG. 7 comprises:

the delay information computing module further comprises:
- a physical parameter initial value acquiring unit 310b configured to acquire, at the reception initiation time, an initial value of a duration-related physical parameter including a physical parameter whose variation is duration-related;
- a physical parameter terminal value acquiring unit 320b configured to acquire, at a time when the rostral neuron information is received, a terminal value of the duration-related physical parameter;
- an acquiring unit for duration for variation of physical parameter 330b configured to compute a duration for variation of the duration-related physical parameter according to the initial value, the terminal value and an algorithm for duration on variation of the physical parameter;
- a second delay information determining unit 340b configured to determine a duration for variation of the duration-related physical parameter as second delay information of the rostral neuron information.

In order to make the object, technical solutions, and advantages of the present disclosure apparent, the present disclosure will be further described in detail below with reference to the accompanying drawings and embodiments. It should be understood that the specific embodiments described herein are merely illustrative of the disclosure and are not intended to limit the disclosure.

Figure 8:
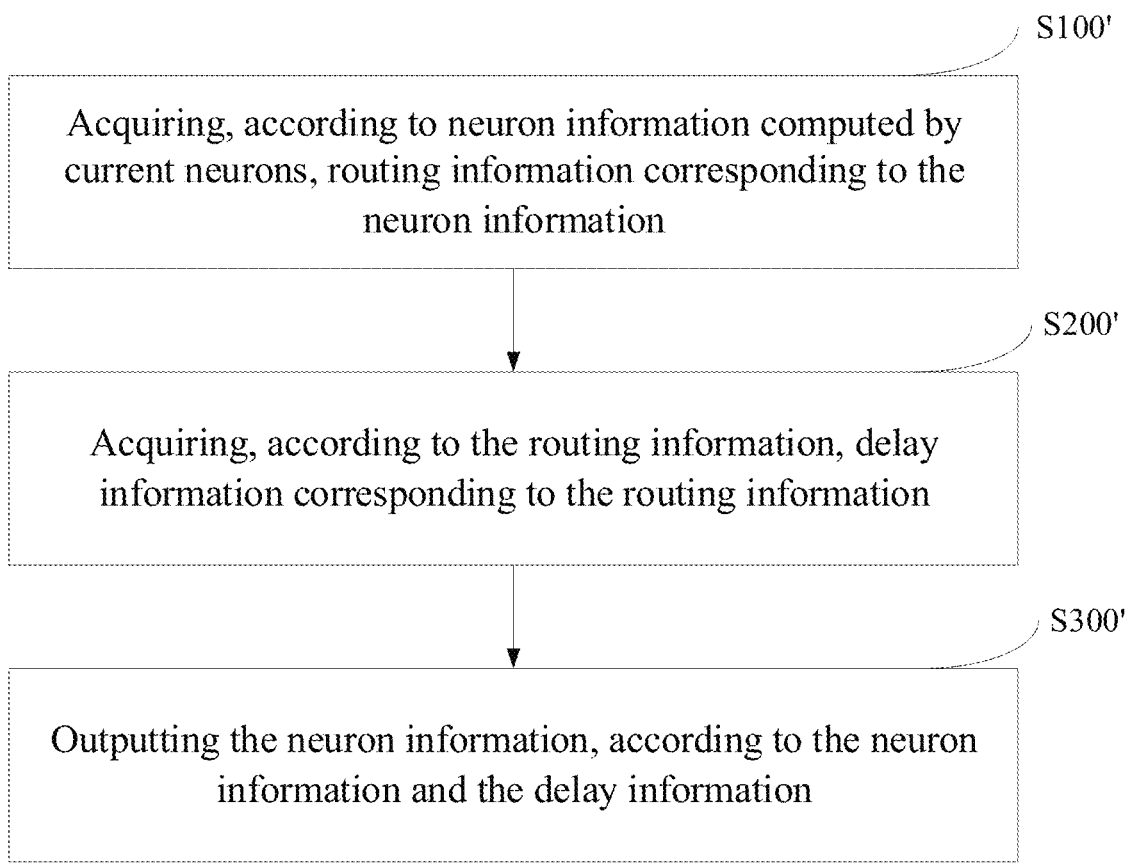
FIG. 8 is a schematic flowchart of a neural network information sending method according to an embodiment.

FIG. 8 is a schematic flowchart of a neural network information sending method according to an embodiment, where the neural network information sending method as shown in FIG. 8 comprises:

Step S100', acquiring, according to neuron information computed by current neurons, routing information corresponding to the neuron information, wherein the routing information includes information of all the routing neurons through which the neuron information passes when being sent from the current neurons to destination neurons, and link information among the routing neurons.

Specifically, the routing information includes fixed routing relationships among the neurons after a task of the neural network is set, and also includes the routings selected by the current neurons per se for different calculated output information according to the output information, including giving a number of fixed routed neurons that need to pass between the current neurons to the destination neurons, or giving fixed routing neuron information between the current neurons and the destination neurons.

After one neuron information is computed, the routing information is acquired through a preset routing schedule to know the routing information by which the neuron information output by the current neurons pass, including which routing neuron is passed through; and the linking relationships among all routing neurons, being connected in an order of the preset number, or dynamical adjusted according to the information amount and the likes, are all included in the scope of this embodiment.

Step S200', acquiring, according to the routing information, delay information corresponding to the routing information.

Specifically, the acquired delay information corresponding to the routing information according to the routing information includes a sending delayed duration of the neuron information set by the routing information.

Step S300', outputting the neuron information according to the neuron information and the delay information.

Specifically, outputting the neuron information according to the neuron information and the delay information includes combining the neuron information and the delay information and having them output, or outputting the neural network after a delayed duration determined by the delay information; containing the delay information in an output of the neuron information may make the neuron information carry richer time domain information.

In this embodiment, the delay information is determined according to the routing information about the routing neurons through which the neuron information computed by the current neurons is sent to the destination neuron, and the neuron information is output based on the delay information and the neuron information. Since the delay information is determined according to the routing information of the neuron information, and the delay information is considered when outputting the neuron information, the neuron information is enabled to carry richer time domain information, thus augmenting operation modes of the neurons and enhancing the generalization ability of the whole network.

Figure 9:
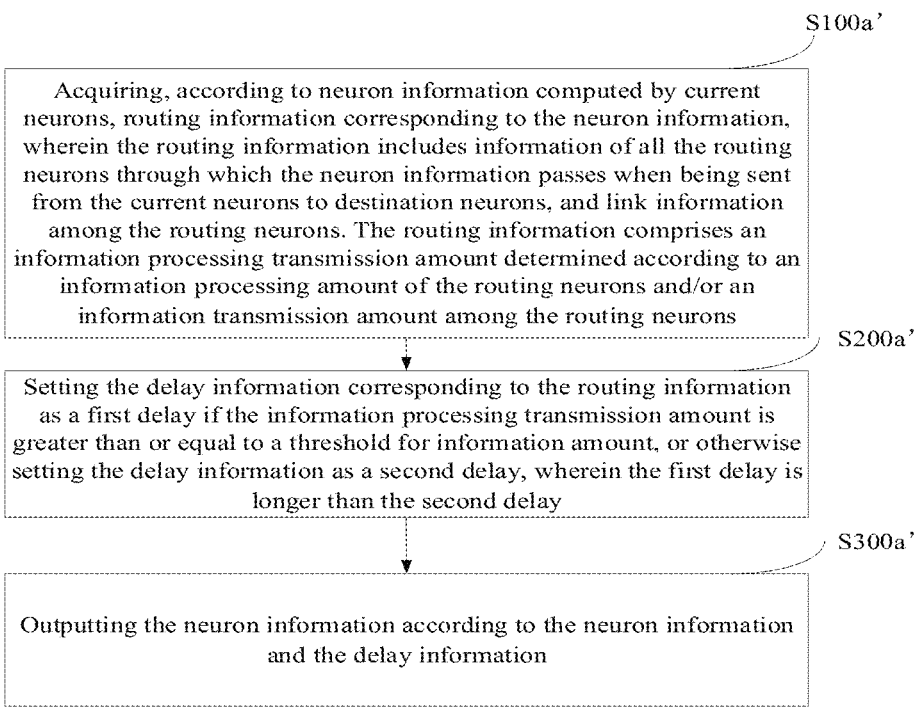
FIG. 9 is a schematic flowchart of a neural network information sending method according to another embodiment.

FIG. 9 is a schematic flowchart of a neural network information sending method according to another embodiment, where the neural network information sending method shown in FIG. 9 comprises:

Step S100a': acquiring, according to neuron information computed by current neurons, routing information corresponding to the neuron information, wherein the routing information includes information of all the routing neurons through which the neuron information passes when being sent from the current neurons to destination neurons, and link information among the routing neurons. The routing information comprises information processing transmission amount determined according to information processing amount of the routing neurons and/or an information transmission amount among the routing neurons.

Specifically, the routing information acquired based on the output information of the neuron includes the information processing transmission amount determined according to the information processing amount of the routing neurons and/or an information transmission amount among the routing neurons. Since the information processing amount of neurons and the information transmission amount among the routing neurons represent the information processing capabilities of respective neurons in the neural network as well as among the neurons, and the hardware limitations on the neurons, the limitations on software implementation, or instantaneous processing congestions of an amount of information and the likes will all have a fixed or non-fixed impact on the information processing capabilities of neurons or the information transmission amount among neurons, considering the information processing transmission amount means a consideration on the overall information processing capability of the neural network.

The delay information is determined according to the information amount of different routings. For example, it is possible to have flexible settings according to the real need of a task in the cases where the routing delay is larger if the information amount is large, or the routing delay is smaller if the information amount is large.

Step S200$a'$, setting the delay information corresponding to the routing information as a first delay if the information processing transmission amount is greater than or equal to a threshold for information amount, or otherwise setting the delay information as a second delay, wherein the first delay is longer than the second delay.

Specifically, a preset threshold for information amount is provided in the present embodiment as the simplest implementation method.

Step S300$a'$, outputting the neuron information according to the neuron information and the delay information.

Specifically, the step S300$a'$ is the same the step S300'.

In this embodiment, the routing information, mainly taking the information processing amount of the routing neurons and the information transmission amount among the routing neurons into consideration, constitutes a total information amount of the entire routing. The delay information is determined according to the information amount of different routings. For example, flexible settings according to the actual needs of the task are possible in the cases where the routing delay is larger if the information amount is large, or the routing delay is smaller if the information amount is large. The method of determining the delay information according to the information amount may consider the processing capability of each neuron in the neural network and improve the processing efficiency of the entire neural network.

In this embodiment, according to the preset threshold for information amount, the delay information of the routing with information amount greater than or equal to the threshold for information amount is set to be larger than the delay information of the routing with information amount less than the information amount threshold. When the delay of the routing with a great information amount in the neural network has increased, the pressure of information processing for the routing with a great information amount can be reduced and the processing load of the entire neural network can be adjusted.

Figure 10:
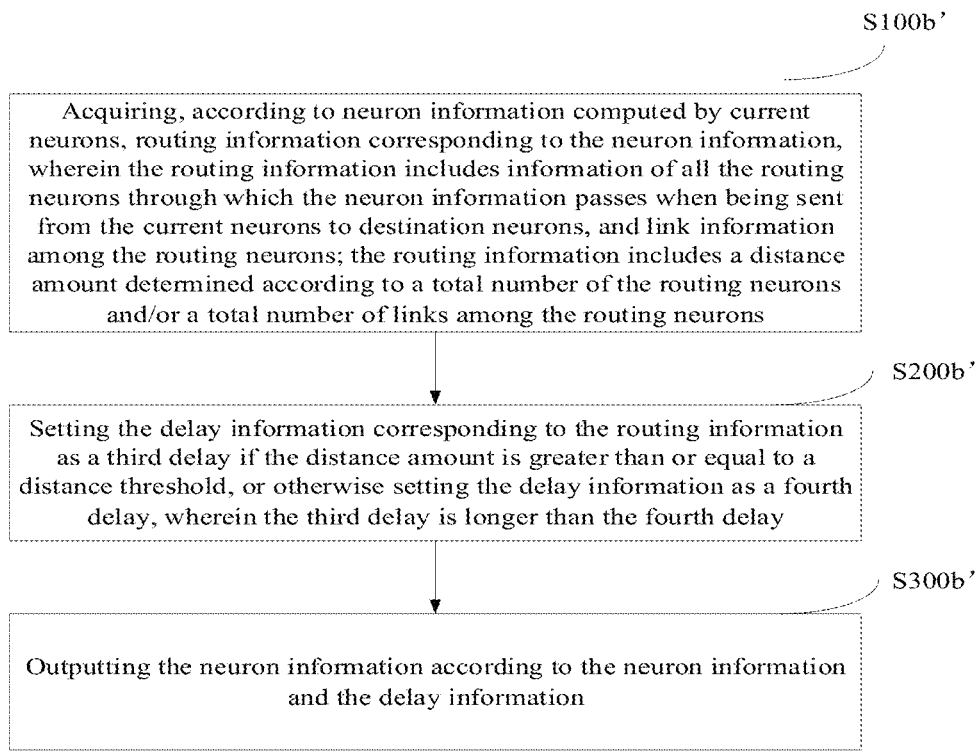
FIG. 10 is a schematic flowchart of a neural network information sending method according to still another embodiment.

FIG. 10 is a schematic flowchart of a neural network information sending method according to still another embodiment, where the neural network information sending method as shown in FIG. 10 comprises:

Step S100$b'$: acquiring, according to neuron information computed by current neurons, routing information corresponding to the neuron information, wherein the routing information includes information of all the routing neurons through which the neuron information passes when being sent from the current neurons to destination neurons, and link information among the routing neurons; the routing information includes a distance amount determined according to a total number of the routing neurons and/or a total number of links among the routing neurons.

Specifically, the distance amount may be determined by taking the total number of the routing neurons and the total number of links among the routing neurons into consideration, such as to have flexible settings according to the need of a task in the cases where the delay for the neurons with a larger routing distance is greater than the delay for the neurons with a smaller routing distance, or the delay for the neurons with a large routing distance is smaller than the delay for the neurons with a small routing distance.

Step S200$b'$, setting the delay information corresponding to the routing information as a third delay if the distance amount is greater than or equal to a distance threshold, or otherwise setting the delay information as a fourth delay, wherein the third delay is longer than the fourth delay.

Specifically, setting different delay information based on the preset distance threshold according to the distance amount is a relatively simple setting method.

Step S300$b'$, outputting the neuron information according to the neuron information and the delay information.

Specifically, the step S300$b'$ is the same as the step S300'.

In this embodiment, the distance amount of the routing is determined according to the total number of routing neurons or the total number of links among the routing neurons, and the delay information is determined according to the distance amount of the routing; it is possible to set the delay of the routing with a larger distance amount to be larger than the delay of the routing with a smaller distance amount to adjust the pressure of information processing for the routing with a great distance amount, such that the processing of the entire neural network is more efficient; it is also possible to set the delay of the routing with a smaller distance amount to be relatively large, such that the synchronization of the information on the entire neural network is better.

Figure 11:
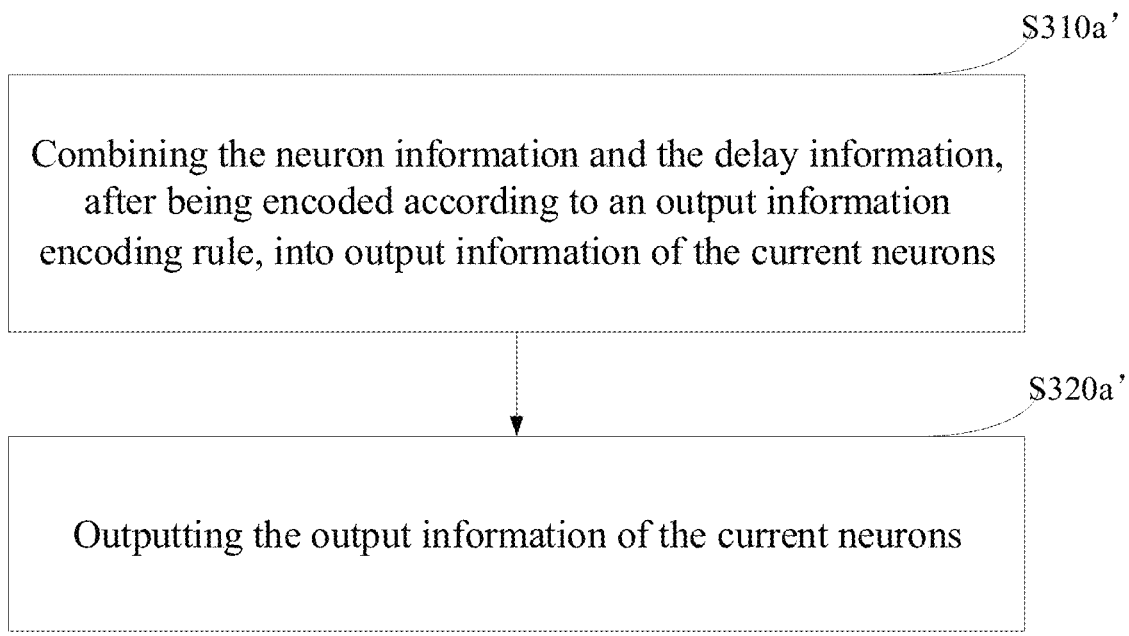
FIG. 11 is a schematic flowchart of a neural network information sending method according to yet another embodiment.

FIG. 11 is a schematic flowchart of a neural network information sending method according to yet another embodiment, where the neural network information sending method as shown in FIG. 11 comprises:

Step S310$a'$, combining the neuron information and the delay information, after being encoded according to an output information encoding rule, into output information of the current neurons.

Specifically, the output information encoding rule includes converting the neuron information and the delay information into bit information (such as 8-bit information) with a preset length according to a certain data conversion algorithm, and then the bit information of the neuron information is combined with the bit information of the delay information to acquire the output information of the current neurons.

Step S320$a'$, outputting the output information of the current neurons.

Specifically, for example, in the routing information received by the neurons, the bit carrying the neuron information and the delay information outputs the neuron information and the delay information by using the routing information, so as to cause the neurons receiving the routing information perform processing on the neuron information according to the delay information; for example, according to the delay information, the neuron information is not processed at a time step when the neuron information is received, but processed at a subsequent time step specified by the delay information.

In this embodiment, the neuron information and the delay information, after being encoded according to an output information encoding rule, are combined into the output information of the current neurons and are output. For example, both the neuron information and the delay information are encoded in the routing information for output, such that the neuron that receives the routing information carrying the delay information performs processing on the neuron information according to the delay information, thus enhancing the information amount of the neuron output information, augmenting operation modes of the neurons and enhancing the generalization ability of the whole network.

Figure 12:
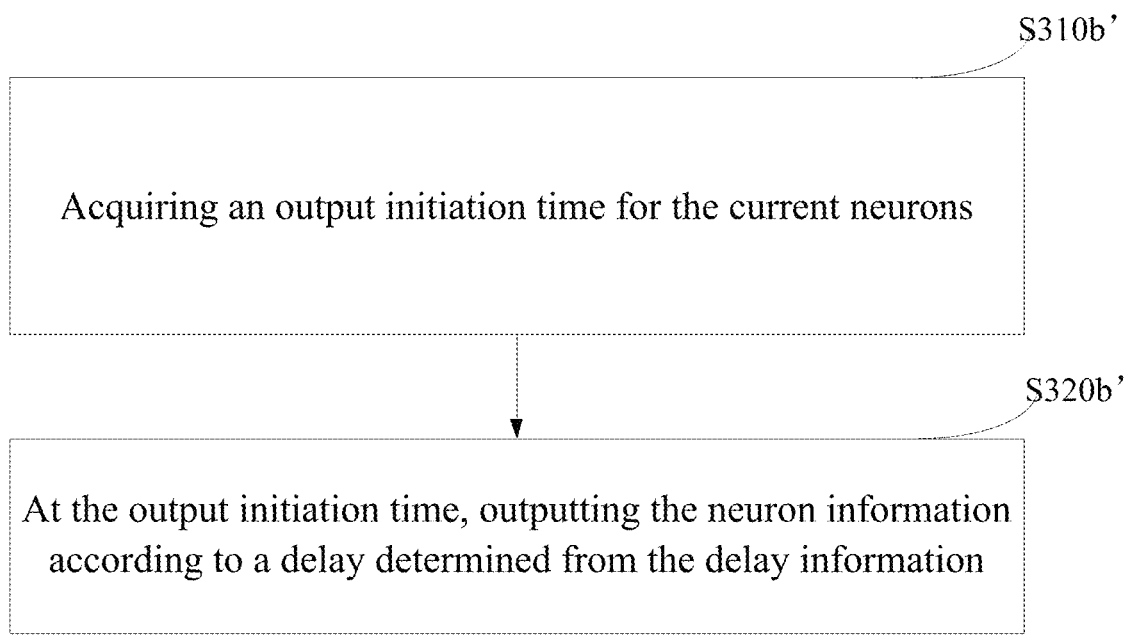
FIG. 12 is a schematic flowchart of a neural network information sending method according to yet another embodiment.

FIG. 12 is a schematic flowchart of a neural network information sending method according to yet another embodiment, where the neural network information sending method as shown in FIG. 12 comprises:

Step S310$b'$, acquiring an output initiation time for the current neurons.

Specifically, the output initiation time for the current neurons includes an output initiation time for each neuron set at the beginning of a task of a neural network; the current neurons, after acquiring the output initiation time, initiate to output the neuron information at the output initiation time.

Step S320$b'$, outputting the neuron information at the output initiation time with a delay according to a delay determined by the delay information.

Specifically, after the output initiation time, the output of the neuron information is delayed according to a delay determined by the delay information, and the delay information is presented in a time domain manner. The neuron information may be output directly after a delay determined by the delay information.

In this embodiment, the output initiation time for the current neuron is determined, and from the output initiation time, the neuron information is released after a delayed duration determined by the delay information. When the neuron information is output, the delay information is fused into the output of the neuron information by the current neurons in a time domain manner, augmenting operation modes of the neurons and enhancing the generalization ability of the entire neural network.

Figure 13:
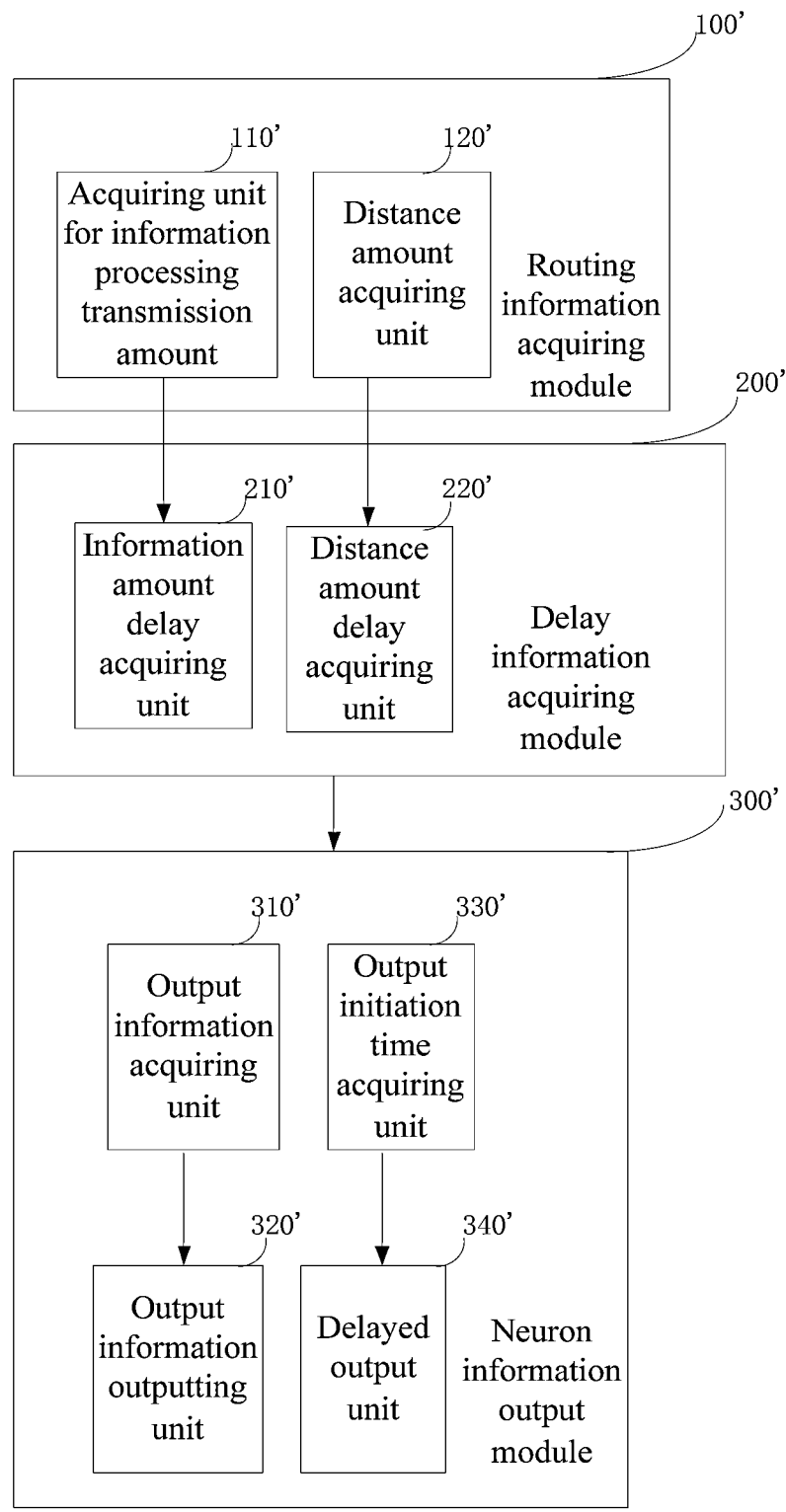
FIG. 13 is a structural diagram showing a neural network information sending system according to an embodiment.

FIG. 13 is a structural diagram of a neural network information sending system according to an embodiment, where the neural network information sending system shown in FIG. 13 comprises:

a routing information acquiring module 100' configured to acquire, according to neuron information computed by current neurons, routing information corresponding to the neuron information, wherein the routing information includes information of all routing neurons through which the neuron information passes when being sent from the current neurons to destination neurons, and link information among the routing neurons.

a delay information acquiring module 200' configured to acquire, according to the routing information, delay information corresponding to the routing information.

a neuron information output module 300' configured to output the neuron information according to the neuron information and the delay information.

In this embodiment, the delay information is determined according to the routing information about the routing neurons through which the neuron information computed by the current neurons is sent to the destination neuron, and the neuron information is output based on the delay information and the neuron information. Since the delay information is determined according to the routing information of the neuron information, and the delay information is considered when outputting the neuron information, the neuron information is enabled to carry richer time domain information, thus augmenting operation modes of the neurons and enhancing the generalization ability of the whole network.

Please further refer to FIG. 13, where the neural network information sending system shown in FIG. 13 comprises:

The routing information acquiring module 100' configured to acquire, according to neuron information computed by current neurons, routing information corresponding to the neuron information, wherein the routing information includes information of all routing neurons through which the neuron information passes when being sent from the current neurons to destination neurons, and link information among the routing neurons. The routing information acquiring module 100' comprises an acquiring unit for information processing transmission amount 110' configured to determine the information processing transmission amount according to the information processing amount of the routing neurons and/or an information transmission amount among the routing neurons; and a distance amount acquiring unit 120' configured to determine a distance amount according to a total number of the routing neurons and/or a total number of links among the routing neurons.

The delay information acquiring module 200' configured to acquire, according to the routing information, delay information corresponding to the routing information, where the delay information acquiring module 200' comprises an information amount delay acquiring unit 210', configured to set the delay information corresponding to the routing information as a first delay if the information processing transmission amount is greater than or equal to a threshold for information amount, or otherwise set the delay information as a second delay, wherein the first delay is longer than the second delay; and a distance amount delay acquiring unit 220' configured to set the delay information corresponding to the routing information as a third delay if the distance amount is greater than or equal to a distance threshold, or otherwise set the delay information as a fourth delay, wherein the third delay is longer than the fourth delay.

The neuron information output module 300' configured to output the neuron information according to the neuron information and the delay information, where the neuron information output module 300' comprises an output information acquiring unit 310' configured to combine the neuron information and the delay information after being encoded according to the output information encoding rule into output information of the current neurons; an output information outputting unit 320' configured to output the output information of the current neurons; further, an output initiation time acquiring unit 330' configured to acquire an output initiation time for the current neurons; and a delayed output unit 340' configured to delay, from the output initiation time according to a delay determined from the delay information, the output of the neuron information.

In this embodiment, the routing information, mainly taking the information processing amount of the routing neurons and the information transmission amount among the routing neurons into consideration, constitutes a total information amount of the entire routing. The delay information is determined according to the information amount of different routings. For example, flexible settings according to the actual needs of the task are possible in the cases where the routing delay is larger if the information amount is large, or the routing delay is smaller if the information amount is large. The method of determining the delay information according to the information amount may consider the processing capability of each neuron in the neural network and improve the processing efficiency of the entire neural network. According to the preset threshold for information amount, the delay information of the routing with information amount greater than or equal to the threshold for information amount is set to be larger than the delay information of the routing with information amount less than the information amount threshold. When the delay of the routing with a great information amount in the neural network has increased, the pressure of information processing for the routing with a great information amount can be reduced and the processing load of the entire neural network can be adjusted. The distance amount of the routing is determined according to the total number of routing neurons or the total number of links among the routing neurons, and the delay information is determined according to the distance amount of the routing; it is possible to set the delay of the routing with a larger distance amount to be larger than the delay of the routing with a smaller distance amount to adjust the pressure of information processing for the routing with a great distance amount, such that the processing of the entire neural network is more efficient; it is also possible to set the delay of the routing with a smaller distance amount to be relatively large, such that the synchronization of the information on the entire neural network is better. The distance amount of the routing is determined according to the total number of routing neurons or the total number of links among the routing neurons, and the delay information is determined according to the distance amount of the routing; it is possible to set the delay of the routing with a larger distance amount to be larger than the delay of the routing with a smaller distance amount to adjust the pressure of information processing for the routing with a great distance amount, such that the processing of the entire neural network is more efficient. The neuron information and the delay information, after being encoded according to an output information encoding rule, are combined into the output information of the current neurons and are output. For example, both the neuron information and the delay information are encoded in the routing information for output, such that the neuron that receives the routing information carrying the delay information performs processing on the neuron information according to the delay information, thus enhancing the information amount of the neuron output information, augmenting operation modes of the neurons and enhancing the generalization ability of the whole network. The output initiation time for the current neuron is determined, and from the output initiation time, the neuron information is released after a delayed duration determined by the delay information. When the neuron information is output, the delay information is fused into the output of the neuron information by the current neurons in a time domain manner, augmenting operation modes of the neurons and enhancing the generalization ability of the entire neural network.

In this embodiment, with a method of measuring a variation of the duration-related physical parameter, by recording an initial value of the duration-related physical parameter at the reception initiation time and recording the terminal value of the duration-related physical parameter at a time when the rostral neuron information is received, a duration for variation of the duration-related physical parameter is computed according to the initial value, the terminal value and the algorithm for duration on variation of the physical parameter, and the duration for variation is determined as the delay information of the rostral neuron information. The present embodiment employs a method of measuring a variation of the physical parameter with diversified optional implementation manners and stable and reliable measurement results, hence reducing the implementation cost of the neural network while improving the bionic degree of the neuron information.

Those skilled in the art will appreciate that embodiments of the present application may be provided as a method, a system, or a computer program product. Thus, the present application may take the form of an full hardware embodiment, a full software embodiment or an embodiment in combination of software and hardware. Moreover, the application may take the form of a computer program product implemented on one or more computer-usable storage media (including but not limited to disk storage, CD-ROM, optical storage and the likes) containing computer usable program code thereon.

The present application is described with reference to flowcharts and/or block diagrams of methods, apparatus (systems), and computer program products according to the embodiments herein. It will be understood that each flow and/or block of the flowcharts and/or block diagrams, and combinations of flows and/or blocks in the flowcharts and/or block diagrams can be implemented by computer program instructions. These computer program instructions can be provided to a general computer, a special-purpose computer, an embedded processor or processors of other programmable data processing devices to produce a machine, such that the instructions executed by a processor of a computer or other programmable data processing device generates a device that implements the functions specified in one or more flows in the flowchart and/or one or more blocks in the block diagram.

The computer program instructions can also be stored in a computer readable memory that can direct a computer or other programmable data processing devices to operate in a particular manner, such that the instructions stored in the computer readable memory produce a product comprising the instruction device. The instruction device implements the functions specified in one or more flows in the flowchart and/or one or more blocks in the block diagram.

These computer program instructions can also be loaded onto a computer or other programmable data processing devices such that a series of operational steps are performed on the computer or other programmable devices to produce computer-implemented processing, so that the instructions executed on the computer or other programmable devices provide steps for implementing the functions specified in one or more flows in the flowchart and/or one or more blocks in the block diagram.

The technical features of the above-described embodiments may be arbitrarily combined. For the sake of brevity of description, not all possible combinations of the technical features in the above embodiments are described. However, all should be considered as falling within the scope of the present disclosure as long as there is no contradiction among the combinations of these technical features.

The above-mentioned embodiments are merely illustrative of several embodiments of the present disclosure, with more specific and detailed descriptions; but these are not to be construed as limiting the scope of the disclosure. It should be noted that a number of variations and modifications may be made by those skilled in the art without departing from the spirit and scope of the disclosure. Therefore, the scope of the present disclosure should be determined by the appended claims.

What is claimed is:

1. A neural network information sending method for a data processing device, comprising:

acquiring, by a hardware processor of the data processing device, according to neuron information computed by current neurons, routing information corresponding to the neuron information, wherein the routing information includes information of all routing neurons through which the neuron information passes when being sent from the current neurons to destination neurons, and link information among the routing neurons, wherein the link information comprises connection link relationships between the routing neurons and all neurons of a neural network and the link information is used to dynamically adjusts a connection route of the routing neurons according to an information amount to be processed by the routing neurons from the current neurons to the destination neurons;

acquiring, by the hardware processor, according to the routing information, delay information corresponding to the routing information including setting the delay information corresponding to the routing information as a first delay if an information processing transmission amount is greater than or equal to a threshold of information amount and setting the delay information as a second delay if the information processing transmission amount is less than the threshold of information amount, wherein the first delay is longer than the second delay; and outputting, by the hardware processor, the neuron information according to the neuron information and the delay information, the neuron information causing neurons receiving the neuron information to not process at a time step when the neuron information is received, and to process the neuron information at a subsequent time step specified by the delay information.

2. The neural network information sending method according to claim 1, wherein the routing information comprises:

the information processing transmission amount determined according to an information processing amount of each of the routing neurons and an information transmission amount among the routing neurons.

3. The neural network information sending method according to claim 1, wherein the routing information further comprises:

a distance value determined according to a total number of the routing neurons and a total number of link connections among the routing neurons.

4. The neural network information sending method according to claim 3, wherein acquiring, according to the routing information, delay information corresponding to the routing information comprises:

setting the delay information corresponding to the routing information as a third delay if the distance value is greater than or equal to a distance threshold, or otherwise setting the delay information as a fourth delay, wherein the third delay is longer than the fourth delay.

5. The neural network information sending method according to claim 1, wherein outputting the neuron information according to the neuron information and the delay information comprises:

combining the neuron information and the delay information, after being encoded according to an output information encoding rule, into output information of the current neurons; and outputting the output information of the current neurons.

6. The neural network information sending method according to claim 5, wherein outputting the neuron information according to the neuron information and the delay information comprises:

acquiring an output initiation time for the current neurons;

at the output initiation time, outputting the neuron information with a delay according to a delay determined according to the delay information.

7. The neural network information sending method according to claim 6, wherein outputting the neuron information according to the neuron information and the delay information comprises:

accumulating the neuron information of the current neurons with the delay information to generate first composite information of the current neurons; and outputting the first composite information of the current neurons as the neuron information.

8. The neural network information sending method according to claim 6, wherein outputting the neuron information according to the neuron information and the delay information comprises:

adjusting a sensitivity of the current neurons by multiplying the neuron information of the current neurons by a scaling factor to generate second composite information of the current neurons; and outputting the second composite information of the current neurons as the neuron information.

9. The neural network information sending method according to claim 8, wherein the scaling factor includes the delay information.

10. The neural network information sending method according to claim 9, wherein the data processing device includes a plurality of crossbar-structure type of neuron computation units and each routing neuron of the neural network is implemented by a neuron computation unit.

11. The neural network information sending method according to claim 1, wherein acquiring, according to the routing information, delay information corresponding to the routing information comprises:

setting the delay information as a fifth delay different than that of the routing information, wherein the fifth delay corresponds to a distance larger than a distance of the routing neurons to better synchronize information of the neural network.

12. The neural network information sending method according to claim 1, further comprising: controlling information flow in the neural network using suppressing neurons, wherein the delay information of neurons is set to a negative value to change a characteristic of the neurons to suppressing neurons.

13. A computing system comprising a processor, a memory and computer instructions stored on the memory, wherein the computer instructions, when executed by the processor, cause the processor to execute steps of the method according to claim 1.

14. A non-transitory computer readable storage medium holding executable instructions readable by a computer system, wherein the executable instructions, when executed by a processor, cause the processor to execute steps of the method according to claim 1.

* * * * *